US006529361B1

(12) United States Patent
Petschel et al.

(10) Patent No.: US 6,529,361 B1
(45) Date of Patent: Mar. 4, 2003

(54) GAS-FILLED DISCHARGE PATH

(75) Inventors: Bernd Petschel, Berlin (DE); Wolfgang Daeumer, Berlin (DE); Juergen Boy, Berlin (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 09/508,788

(22) PCT Filed: Sep. 10, 1998

(86) PCT No.: PCT/DE98/02757

§ 371 (c)(1), (2), (4) Date: Aug. 9, 2000

(87) PCT Pub. No.: WO99/14782

PCT Pub. Date: Mar. 25, 1999

(30) Foreign Application Priority Data

Sep. 16, 1997 (DE) .......................................... 197 41 658

(51) Int. Cl.[7] .................................................. H02H 9/00

(52) U.S. Cl. ...................... 361/120; 361/91.1; 361/111; 361/127

(58) Field of Search .......................... 361/56, 91.1, 111, 361/115, 120, 123, 127; 313/231.11, 231.31, 231.41

(56) References Cited

U.S. PATENT DOCUMENTS 3,582,702 A * 6/1971 Hermann et al. ........... 313/174
5,995,355 A * 11/1999 Daeumer .................... 361/120

FOREIGN PATENT DOCUMENTS

| | | | |
|---|---|---|---|
| CH | 652246 | | 10/1985 |
| DE | 1 280 384 | | 10/1968 |
| DE | 24 45 063 | | 4/1978 |
| DE | 31 06 763 | | 7/1983 |
| DE | 37 23 571 | | 1/1989 |
| DE | 197 01 816 | | 7/1997 |
| EP | 0 381 004 | | 8/1990 |
| EP | 0381004 | * | 8/1990 |
| EP | 0 436 529 | | 7/1991 |
| WO | WO 90/03677 | | 4/1990 |
| WO | WO-9725760 | * | 7/1997 |

* cited by examiner

*Primary Examiner*—Stephen W. Jackson
(74) *Attorney, Agent, or Firm*—Kenyon & Kenyon

(57) ABSTRACT

Gas-filled discharge paths such as voltage surge protectors and spark gaps can have a low ignition delay in dark spaces when a special activating compound is used. To simplify the manufacture of such discharge paths, fully nickel-plated electrodes are used; in addition, nickel in a metallic form, in addition to titanium, is also added to the special activating compound.

9 Claims, 1 Drawing Sheet

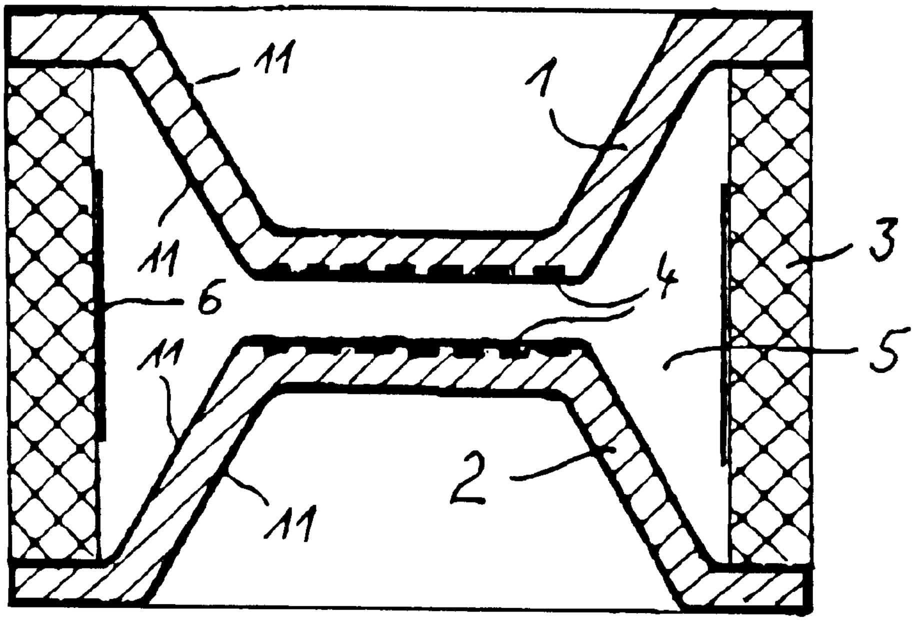
11
1
3
11
11
6
4
5
11
2
11

GAS-FILLED DISCHARGE PATH

FIELD OF THE INVENTION

The present invention relates to electronic components and may be used when designing gas-filled discharge paths having at least two electrodes, where an electrode activating compound which has a plurality of components is applied to at least one of the electrodes in order to stabilize their ignition, operating and extinction properties.

BACKGROUND INFORMATION

In order to ensure the desired operating characteristics such as ignition voltage, response time, static response voltage, dynamic response time, extinction voltage, and glow operating voltage of discharge paths such as spark gaps or voltage surge protectors filled with inert gases, different measures such as electrode design, type and pressure of filling gas, and selection of the activating compound applied to the active surfaces of the electrodes must be adjusted to one another. Furthermore, in order to obtain specific conditions, it is customary to arrange one or more ignition strips on the inner wall of the glass or ceramic insulator and possibly provide a special ionization source, for example, a dot-like deposit of a radioactive material. In order to form a gaseous discharge path, which has a low ignition delay in a dark space without the use of an additional ionization source, an electrode activating compound having a plurality of components is used which, in addition to the customary base component in the form of one or more alkaline or alkaline earth halides and/or sodium and/or potassium silicate in an amount of 30 to 60 wt. %, also contains a barium compound and a transition metal in metallic form such as titanium in an amount of 5 to 25 wt. % and an oxide of cesium and a transition metal such as tungsten, i.e.,., cesium tungstenate ($Ce_2WO_4$) also in an amount of 5 to 25 wt. %. When using such an electrode activating compound, it has been found that the ignition voltage of the first ignition after a 24-hour dark storage of the discharge path is within the range required by users for such discharge paths (German Patent Application No. 197 01 816).

For gas-filled discharge paths such as spark gaps or voltage surge protectors, electrodes made of a nickel-iron or a nickel-iron-cobalt alloy or of copper are customarily used. The outer surface of these electrodes is usually nickel plated after soldering the electrodes to the insulator and prior to performing other operations such as welding electrical leads and testing to protect it against oxidation. For this purpose, a plurality of discharge paths are galvanically treated as a unit after the soldering process (World Patent No. 90/90 03 677 and European Patent No. 436 529).

SUMMARY

An object of the present invention is to simplify the manufacturing process of non-radioactive discharge paths having a low ignition delay in a dark space and thus to meet the strictest requirements for constancy of electrical values of these discharge paths.

In order to achieve this object, according to the present invention, the electrodes of the discharge path are provided with a nickel plating having a thickness of at least 5 $\mu$m on their surfaces located both outside the discharge area and inside the discharge area, the electrode activating compound containing metallic nickel in addition to titanium.

The present invention also provides for the use of nickel plated electrodes for the discharge paths in question. This nickel plating may take place prior to the separation of the individual electrodes for assembly to form the discharge path. This early nickel plating of the electrodes makes it possible to manufacture the discharge path as a unit in few manufacturing steps, which may take place one immediately following the other. The continuous manufacturing process, in which individual parts are handled individually in a plurality of manufacturing steps (application of the activating compound to the electrodes, attaching the insulator to the electrodes, degassing, soldering, imprinting, welding of the electrical leads, measuring) is therefore not interrupted by an extraneous manufacturing step. This has a beneficial effect on the manufacturing costs. On the other hand, the invention takes into account the fact that full nickel plating of the electrodes will not fail to exert an effect on the electrical properties of the discharge path, since the electrode surfaces in the gas space are no longer formed by a copper or nickel-iron layer, but by a nickel layer. In order to stabilize this effect, the invention calls for the nickel layer to have a minimum thickness, so that the nickel layer is not fully or partially eroded during the discharge processes, and a potassium or sodium silicate to be selected and the electrode activating compound to contain nickel in addition to titanium as a transition metal component in a metallic form, in order to ensure adhesion of the electrode activating compound to the electrode surfaces at AC currents of 20 A and current surges of 20 kA thus extending their service life. Minimum nickel erosion during discharge can only be supported by using pure argon or a mixture of argon and neon for gas filling. An ignition voltage that is as low as possible also has a favorable effect in this respect. Operating voltage, extinction characteristics, and the provision of charge carriers can be optimized by adding an alkali halide or an alkali borate to the electrode activating compound as an additional component, in an amount of 5 to 15 wt. %.

One embodiment of the discharge path according to the present invention in the form of a voltage surge protector is illustrated in the FIGURE.

The voltage surge protector has two bowl-shaped electrodes 1 and 2 made of copper, which are soldered into the front side of ceramic insulator 3. Prior to soldering, electrodes 1 and 2 are provided with an approximately 6 $\mu$m thick nickel layer 11 by means of electroplating.

The active surfaces of electrodes 1 and 2 are coated with an activating compound 4, which is embedded in the surface depressions of the electrodes. This activating compound is a compound based on alkali or alkali earth silicates, for example, a mixture of sodium silicate and potassium silicate in the proportion of 20 wt. % each. Other components include a barium compound such as barium-aluminum in an amount of 20 wt. %, titanium and nickel as a transition metal in a metallic form in amounts of 10 wt. % each, cesium and tungsten oxides in amounts of 10 wt. % each, and a sodium tetraborate also in the amount of 10 wt. %.

The voltage surge protector is also provided with an argon- or argon and neon-based gas filling 5.

Graphite ignition strips 6 are applied to the inner wall of insulator 3; these are also known as central ignition strips, which are not connected to either of the two electrodes. Instead of the central ignition strips, ignition strips connected to one or both electrodes can also be provided.

What is claimed is:

1. A gas filled discharge path, comprising:

at least two electrodes, an electrode activating compound being applied to at least one of the at least two electrodes, the activating compound being at least one of: i) sodium silicate-based, and ii) potassium silicate-based, the activating compound including a barium compound, titanium in a metallic form and oxides of cesium and a transition metal, and nickel in a metallic form, surfaces of the at least two electrodes having an at least 5 μm thick nickel layer situated outside a discharge area and within the discharge area.

2. The discharge path according to claim 1, wherein the titanium and the nickel in the activating compound are in approximately equal proportions.

3. A gas filled discharge path, comprising:

at least two electrodes, an electrode activating compound being applied to at least one of the at least two electrodes, the activating compound being at least one of: i) sodium silicate-based, and ii) potassium silicate-based, the activating compound including a barium compound, titanium in a metallic form and oxides of cesium and a transition metal, and nickel in a metallic form, surfaces of the at least two electrodes having an at least 5 μm thick nickel layer situated outside a discharge area and within the discharge area;

wherein the activating compound further includes one of: i) an alkali halide, and ii) an akali borate, in an amount of between 5 and 15%.

4. The discharge path according to claim 1, wherein the discharge path is one of a spark gap and a voltage surge protector.

5. A method for manufacturing a gas filled discharge path, comprising:

applying an activating compound to at least one of at least two electrodes, the activating compound being at least one of i) sodium silicate-based, and iii) potassium silicate-based, the activating compound including a barium compound, titanium in a metallic form, and oxides of cesium and a transition metal, and nickel in a metallic form;

plating surfaces of the at least two electrodes with an at least 5 μm thick layer of nickel; and attaching the at least two electrodes to a ceramic insulator to form the discharge path, the at least two electrodes being attached so that the nickel plated surfaces of the of the at least two electrodes are situated outside a discharge area and within the discharge area.

6. The method according to claim 5, wherein the applying step includes applying the activating compound, the titanium in the metallic form and the nickel in the metallic form being provided in approximately equal proportions.

7. The method according to claim 5, wherein the applying step includes applying the activating compound, wherein the activating compound includes one of: i) an alkali halide, and ii) an alkali borate, in an amount of between 5 and 15%.

8. The method according to claim 5, further comprising:

providing the discharge path as one of a spark gap and a voltage surge protector.

9. A gas filled discharge path, comprising:

at least two electrodes, an electrode activating compound being applied to at least one of the at least two electrodes, the activating compound being at least one of: i) sodium silicate-based, and ii) potassium silicate-based, the activating compound including a barium compound, titanium in a metallic form and oxides of cesium and a transition metal, and nickel in a metallic form, surfaces of the at least two electrodes having an at least 5 μm thick nickel plating, the plated surfaces situated outside a discharge area and within the discharge area.

* * * * *